UNITED STATES PATENT OFFICE 2,007,199

ANILINE HYDROHALIDE PREPARATION

Lee Cone Holt, Edgemoor, and Herbert Wilkens Daudt, Wilmington, Del., assignors to E. I. du Pont de Nemours & Company, Wilmington, Del., a corporation of Delaware No Drawing. Application July 14, 1932, Serial No. 622,456

8 Claims. (Cl. 260—130.5)

This invention relates to the preparation of a carbon compound and more particularly to the preparation of aniline hydrochloride.

It has for an object the preparation of aniline hydrochloride by an improved process. Other objects are the preparation of aniline hydrochloride in a very desirable physical form, its preparation in a high state of purity and in general an advancement of the art. Other objects will appear hereinafter.

According to the literature, aniline hydrochloride decomposes at 250° C. It has now been discovered that excellent quality aniline hydrochloride in a very desirable physical form may be produced by reacting anhydrous aniline vapor and anhydrous hydrogen chloride gas by bringing them into contact at temperatures in excess of 250° C. The reaction taking place is probably that indicated by the following equation:

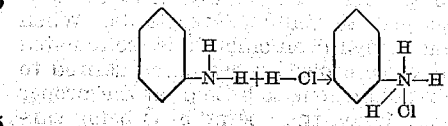

The invention will be further understood from a consideration of the following detailed description and specific examples in which the parts are given by weight.

Example I

Aniline (which boils at 184° C.) was vaporized by passing it into a vessel maintained at a temperature of 210° C.–230° C. The aniline vapor formed was passed from the evaporator or vaporizing vessel into a mixing chamber and there contacted with hydrogen chloride gas at such a rate that the zone in which the aniline and hydrogen chloride were contacted was maintained at 260° C.–270° C. During a period of two hours 186 parts of aniline vapor and 200 parts of hydrogen chloride gas were passed through the aforesaid zone. Finely divided pure white crystals of aniline hydrochloride were, at atmospheric pressure, collected as the product of the reaction. This product analyzed 71.78% aniline (aniline hydrochloride theoretically contains 71.85% aniline), 27.27% chlorine (aniline hydrochloride theoretically contains 27.38% chlorine) and had a melting point of 197.5° C.–197.8° C. (according to International Critical Tables, aniline hydrochloride melts at 198° C.).

Example II

Another run, similar to that described in Example I, was made but in this instance the temperature of the mixing zone was maintained at 352° C.–360° C. An excess of hydrogen chloride over that required to combine with the aniline was maintained at all times and the aniline vapor was added at the rate of 2 lbs. per hour. The product obtained was similar in appearance to the material produced in Example I. Upon analysis it was shown to be 71.70% aniline and 27.50% chlorine. It had a melting point of 197.3° C.–197.6° C. It was noted that the zone wherein the aniline and hydrogen chloride were contacted was roughly cylindrical and about one-half inch in diameter.

Example III

Aniline was reacted with hydrogen chloride under conditions similar to those set forth in Examples I and II while maintaining a temperature of 300° C. Fine white crystalline aniline hydrochloride analyzing 71.75% aniline and 27.38% chlorine was produced. It had a melting point of 198° C.–198.4° C.

Example IV

During a period of one hour 1 and ½ lbs. of aniline were passed into an excess of hydrogen chloride over the amount molecularly required to combine with the aniline to form aniline hydrochloride. The temperature was maintained at 415° C.–425° C. A contact zone of approximately one-half inch in diameter was present during the process. Finely divided fluffy white aniline hydrochloride analyzing 71.81% aniline and 27.37% chlorine was produced. The material had a melting point of 197.8° C.–198.2° C.

Example V

Another run, similar to that described in Example IV, was carried out utilizing hydrogen chloride which contained moisture in an amount less than 1%. Similar material, that is, a product having the same degree of purity and the same melting point, was produced.

Example VI

While maintaining a temperature of 450° C.–460° C. aniline was contacted with hydrogen chloride. Fine, white, crystalline, fluffy aniline hydrochloride, having a melting point of 197.2° C.–197.7° C. was obtained. The reaction was continued for one hour during which time one pound of aniline was reacted. The product upon analysis was shown to be 71.22% aniline and 27.29% chlorine. The mixing zone of the process above described was less than three-fourths of an inch in diameter.

For convenience in understanding the invention, Table I below gives the chemical analysis and melting range of the aniline hydrochloride product produced at various temperatures:

TABLE I

*Properties of reaction product*

| Reaction temperature ° C. | Analysis | | Melting point ° C. |
|---|---|---|---|
| | Percent aniline | Percent chlorine | |
| 260–270 | 71.78 | 27.27 | 197.5–197.8 |
| 300 | 71.75 | 27.38 | 198.0–198.4 |
| 352–360 | 71.70 | 27.50 | 197.3–197.6 |
| 415–425 | 71.81 | 27.37 | 197.8–198.2 |
| 450–460 | 71.22 | 27.29 | 197.2–197.7 |
| Theoretical composition $C_6H_5$-$NH_2.HCl$ | 71.85 | 27.38 | |
| International critical tables | | | 198. |

As indicated in the preceding examples a very pure product has been obtained utilizing temperatures in the contact zone as high as 460° C. So far as now appears temperatures in excess of 500° C., for example 550° C., may be used. It is, of course, not desired to limit the operation of the process to temperatures below this point for the reason that good quality aniline hydrochloride may be produced by contacting the reactants at higher temperatures. The chief factor affecting the upper limit of the operating temperature for the contact zone appears to be the purity of the resultant product. Whatever this limit is will, of course, depend upon the desires of the individual operating the process and the particular apparatus with which and conditions under which the operation is conducted. Higher temperatures in the reaction zone facilitate collection of the product at greater distances therefrom.

When attempts are made to prepare aniline hydrochloride by conducting aniline into hydrogen chloride at temperatures below 260° C., for example 240° C., 245° C. and 250° C., the results are not especially satisfactory from a commercial standpoint. At the lower temperatures the reaction product of the aniline and hydrogen chloride gas is largely a liquid (aniline hydrochloride boils at 245° C.) which, upon cooling, solidifies into hard cakes. The resultant material is usually dark colored and of inferior quality. This material in large scale operation offers some difficulty in handling, necessitating a primary breaking up of the cake or cakes for removal from the reaction product collection chamber and a subsequent grinding or similar operation to put the material in finely divided form. Furthermore, under some circumstances the liquid or pasty reaction product formed occludes free aniline resulting in an impure product which cannot readily be converted to one of desirable chemical purity.

Preferably the process herein described is carried out within the temperature range of 260° C.–300° C. The more specific range 260° C.–270° C. gives desirable results.

The method of bringing the reactants together has no particular effect upon the success of the process. The aniline vapor may be contacted with the hydrogen chloride gas in a reaction chamber and the reaction product collected in another part of the same chamber or it may be passed into another chamber or vessel and collected therein. Either or both of the reactants may be diluted with carbon dioxide, nitrogen, helium, argon or any other gas which is non-reactive with the aniline and hydrogen chloride. If desired, mixtures of the inert diluting gases may be used.

The proportions of the reacting components may be varied over a wide range to obtain any desired results but for efficient operation and high purity of product it is desirable to maintain the hydrogen chloride present in at least theoretically molecular combining proportions. Preferably a molecular excess of hydrogen chloride gas is maintained in the mixing or reaction vessel.

While the process above described has been treated in instances as an anhydrous process, it is not intended to indicate that the presence of small amounts of water prevents the process from being commercially practical.

For large scale operation it is desirable to use corrosion-resistant apparatus. Tantalum, chromium steels, molybdenum steels (for example, "Hastalloy A") and the like, may be satisfactorily used. The vessel used for collecting the aniline hydrochloride, like the other parts of the apparatus, may be made of or lined with the corrosion-resistant material. Lead lined collection chambers operate satisfactorily.

In small scale operation glass or like apparatus may be used.

Such expedients as superatmospheric pressure, subatmospheric pressure, gas-tight apparatus, and the like, may be used.

A large excess of hydrogen chloride gas may be utilized as a means of carrying the aniline hydrochloride formed out of the reaction zone into a settling or collecting space. In such an instance the excess hydrogen chloride gas may be collected and again passed through the reaction zone. The same is true of any inert or non-reacting gas used to dilute the reactants. When the inert gas or hydrogen chloride is recirculated the same may be cooled or heated as desired to enable the reaction zone to be kept at the proper temperature. When the operation is being carried out at the higher temperatures of the range previously mentioned, the recirculation of the heated gases is especially desirable as a means of heat economy.

As indicated previously in the specification, it is stated in the literature that substantial decomposition of aniline hydrochloride takes place at temperatures in excess of 250° C. Contrary to the teachings in the art, it has been discovered that aniline hydrochloride may be produced according to this invention on a large scale at temperatures of 251° C. and higher.

This invention has numerous advantages as will be obvious to those skilled in the art. Among these may be mentioned a process for preparing aniline hydrochloride which is not limited to a narrow temperature range (a feature which is always a disadvantage in commercial operations), which produces the desired product in a desirable, attractive, commercially acceptable physical form, which produces a product of high purity and which is extremely simple in operation. Other advantages which merit particular mention are excellent yields, elimination of auxiliary substances and a process involving direct reaction of the raw materials.

As many apparently widely different embodiments of this invention may be made without departing from the spirit and scope thereof, it is to be understood that we do not limit ourselves to the specific embodiments thereof except as defined by the appended claims.

We claim:

1. The process of preparing aniline hydrohalides which comprises reacting aniline vapor and a hydrogen halide by bringing them into contact at temperatures greater than 250° C. but lower than 550° C.

2. The process of preparing aniline hydrochloride which comprises reacting aniline vapor and hydrogen chloride gas by bringing them into contact within the temperature range of 260° C. to 270° C.

3. The process of preparing aniline hydrochloride which comprises reacting aniline vapor and hydrogen chloride gas by bringing them into contact within the temperature range of 260° C. to 300° C.

4. The process of preparing aniline hydrochloride which comprises reacting aniline vapor and hydrogen chloride gas by bringing them into contact within the temperature range of 260° C. to 360° C.

5. The process of preparing aniline hydrochloride which comprises reacting aniline vapor and hydrogen chloride gas by bringing them into contact within the temperature range of 260° C. to 460° C.

6. The process of preparing aniline hydrochloride which comprises reacting aniline vapor and hydrogen chloride gas by bringing them into contact within the temperature range of 260° C. to 550° C.

7. The process which comprises contacting aniline vapor and hydrogen chloride gas at temperatures which are higher than 250° C. but lower than 550° C.

8. The process of preparing non-pasty aniline hydrochloride which comprises contacting aniline vapor with hydrogen chloride gas by bringing them into contact at temperatures in excess of 270° C. but less than 300° C.

LEE CONE HOLT.
HERBERT WILKENS DAUDT.